(12) United States Patent
Xiang et al.

(10) Patent No.: US 12,482,908 B2
(45) Date of Patent: Nov. 25, 2025

(54) BATTERY AND MANUFACTURING METHOD OF BATTERY

(71) Applicant: CALB Co., Ltd., Jiangsu (CN)

(72) Inventors: Luoyi Xiang, Changzhou (CN); Zhengke Yang, Changzhou (CN); Shengjie Qiu, Changzhou (CN)

(73) Assignee: Jiangsu, Jiangsu (CN)

( * ) Notice: Subject to any disclaimer, the term of this patent is extended or adjusted under 35 U.S.C. 154(b) by 491 days.

(21) Appl. No.: 18/150,781

(22) Filed: Jan. 5, 2023

(65) Prior Publication Data
US 2024/0106097 A1 Mar. 28, 2024

(30) Foreign Application Priority Data
Sep. 23, 2022 (CN) .......................... 202211167938.3

(51) Int. Cl.
H01M 50/627 (2021.01)
(52) U.S. Cl.
CPC ................. *H01M 50/627* (2021.01)
(58) Field of Classification Search
CPC ........................... H01M 50/627; H01M 50/609
See application file for complete search history.

(56) References Cited

FOREIGN PATENT DOCUMENTS

| CN | 107876979 | 4/2018 |
| CN | 107978700 | 5/2018 |
| CN | 218498334 | 2/2023 |
| EP | 3916891 | 12/2021 |
| JP | 2015103309 | 6/2015 |
| WO | 2007028152 | 3/2007 |

OTHER PUBLICATIONS

"Search Report of Europe Counterpart Application", issued on Sep. 8, 2023, p. 1-p. 8.
"Office Action of China Counterpart Application", issued on Jun. 30, 2025, p. 1-p. 5.

*Primary Examiner* — Sarah A. Slifka
(74) *Attorney, Agent, or Firm* — JCIP GLOBAL INC.

(57) ABSTRACT

The disclosure relates to the technical field of batteries, and provides a battery and a method for manufacturing the battery. The battery includes a liquid injection hole and a positioning portion, the liquid injection hole has a first center point, the positioning portion is formed with a second center point. There is a preset distance between the first center point and the second center point, so as to determine the first center point through the second center point. The liquid injection hole has a first center point, the positioning portion is formed with the second center point, and there is a preset distance between the first center point and the second center point.

18 Claims, 6 Drawing Sheets

BATTERY AND MANUFACTURING METHOD OF BATTERY

CROSS-REFERENCE TO RELATED APPLICATION

This application claims the priority benefit of China application serial no. 202211167938.3, filed on Sep. 23, 2022. The entirety of the above-mentioned patent application is hereby incorporated by reference herein and made a part of this specification.

BACKGROUND

Technical Field

The disclosure relates to the technical field of batteries, in particular to a battery and a method for manufacturing the battery.

Description of Related Art

In the related art, internal electrolyte may be injected to the battery through a liquid injection hole. During the injection process of electrolyte, crystallization might be formed around the liquid injection hole. The presence of crystallization might affect the precision of sealing nail for sealing the liquid injection hole subsequently.

SUMMARY

The disclosure provides a battery and a manufacturing method of the battery.

In a first aspect of the present disclosure, a battery is provided. The battery includes a liquid injection hole and a positioning portion. The liquid injection hole has a first center point, the positioning portion is formed with a second center point, and there is a preset distance between the first center point and the second center point, so as to determine the first center point through the second center point.

The battery in an embodiment of the present disclosure includes a liquid injection hole and a positioning portion. The liquid injection hole is configured to inject electrolyte into the battery, and the configuration of the positioning portion may be used as an auxiliary positioning structure in the process of positioning the liquid injection hole, so as to realize precise positioning of the liquid injection hole. The liquid injection hole has a first center point, the positioning portion is formed with a second center point, and there is a preset distance between the first center point and the second center point. Even if crystallization is formed around the liquid injection hole during the electrolyte injection process, and it is difficult to directly determine the first center point of the liquid injection hole, since the presence of the positioning portion makes it possible to accurately determine the second center point, the first center point may be accurately determined through the preset relationship between the first center point and the second center point, and the liquid injection hole may be positioned accurately.

In a second aspect of the present disclosure, a method for manufacturing a battery is provided, including: injecting electrolyte into the battery through the liquid injection hole on the battery, and the liquid injection hole has a first center point; determining the second center point formed by the positioning portion through the positioning portion on the battery; determining the position of the first center point according to the preset distance between the second center point and the first center point; configuring the sealing structure in the liquid injection hole according to the position of the first center point.

The manufacturing method of the battery in the embodiment of the present disclosure includes injecting the electrolyte into the battery through the liquid injection hole on the battery, determining the second center point formed by the positioning portion through the positioning portion on the battery, and there is a preset distance between the second center point and the first center point.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

Figure 1:
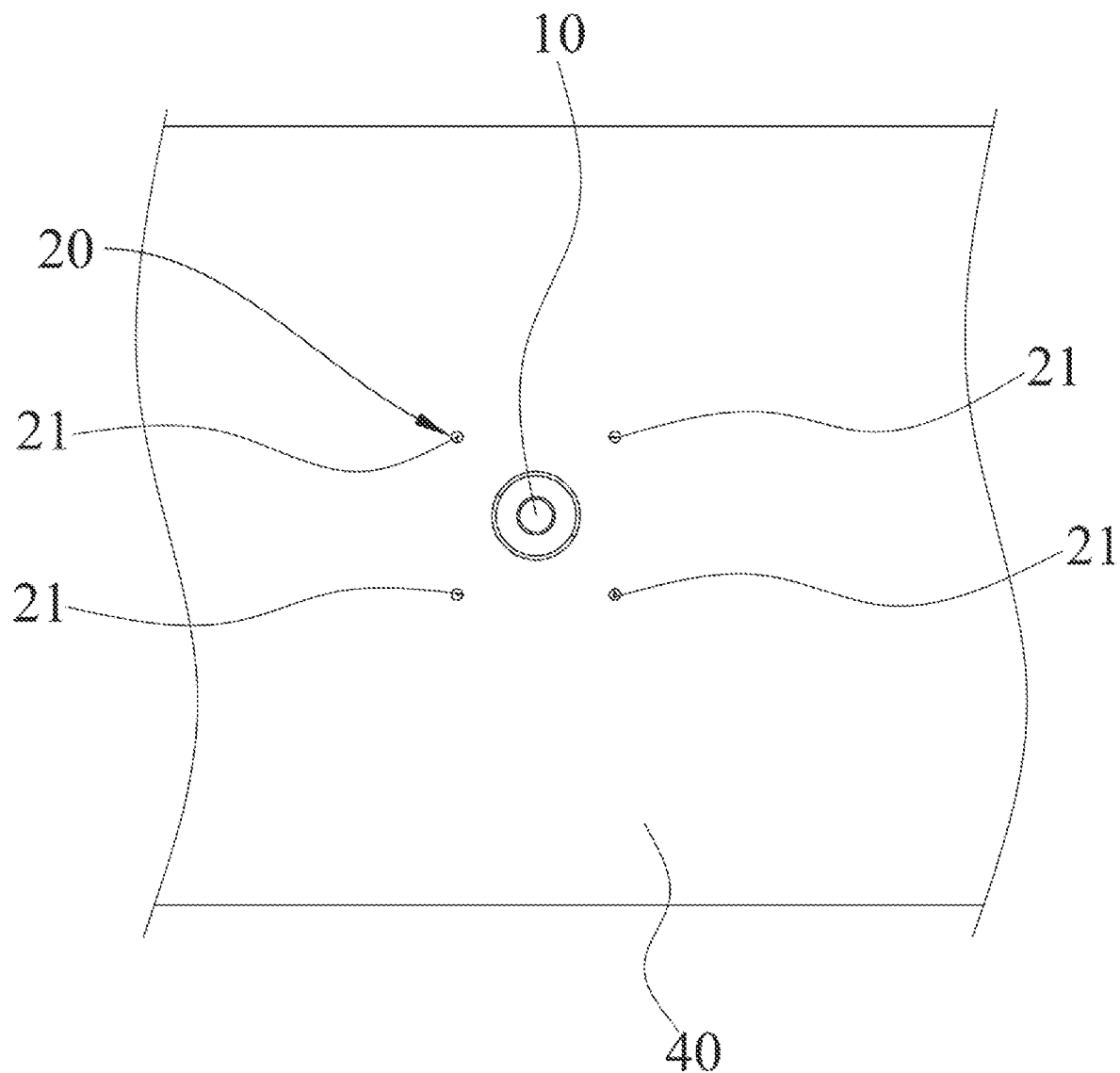
FIG. 1 is a partial structural diagram of a battery according to the first exemplary embodiment.

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

The disclosure provides a battery and a manufacturing method of the battery to improve the operation performance of the battery.

An embodiment of the present disclosure provides a battery, please refer to FIG. 1 to FIG. 6. The battery includes a liquid injection hole 10 and a positioning portion 20. The liquid injection hole 10 has a first center point, the positioning portion 20 is formed with a second center point, and there is a preset distance between the first center point and the second center point, so that the first center point may be determined through the second center point.

The battery in an embodiment of the present disclosure includes a liquid injection hole 10 and a positioning portion 20. The liquid injection hole 10 is configured to inject electrolyte into the battery, and the configuration of the positioning portion 20 may be used as an auxiliary positioning structure in the process of positioning the liquid injection hole 10, so as to realize precise positioning of the liquid injection hole 10. The liquid injection hole 10 has a first center point, the positioning portion 20 is formed with a second center point, and there is a preset distance between the first center point and the second center point. Even if crystallization is formed around the liquid injection hole 10 during the electrolyte injection process, and it is difficult to directly determine the first center point of the liquid injection hole 10, since the presence of the positioning portion 20 makes it possible to accurately determine the second center point, the first center point may be accurately determined through the preset relationship between the first center point and the second center point, and the liquid injection hole 10 may be positioned accurately. In this manner, the subsequent precise sealing of the liquid injection hole 10 may be ensured, thereby improving the safe operation performance and manufacturing efficiency of the battery.

It should be noted that during the process of injecting the electrolyte into the battery, the electrolyte might form crystallization due to electrolysis, causing the outer periphery of the liquid injection hole 10 to be blocked. When taking a picture of the periphery of the liquid injection hole 10, the peripheral contour of the liquid injection hole 10 is destructed due to the blockage of the electrolyte crystallization, which affects positioning of the center of the liquid injection hole 10, and then affects the sealing precision of the liquid injection hole 10. For example, the liquid injection hole 10 is pre-sealed by using a sealing nail, and then welded and sealed by using the sealing nail cap. The sealing nail may be deformed due to its elasticity. Therefore, even if the positioning is not accurate enough, and the sealing nail may also be assembled with the liquid injection hole 10. However, when riveted sealing metal nails or other metal nails are used for sealing, the inaccurate positioning of the liquid injection hole 10 will cause the metal sealing nails to rub against the interior of the battery, which might cause metal shavings to cause the risk of short circuits inside the battery. In this embodiment, the second center point of the positioning portion 20 may be obtained through the configuration of the positioning portion 20. Moreover, there is a preset positional relationship between the first center point and the second center point, that is, there is a preset distance between the first center point and the second center point; accordingly, the position of the first center point may be determined after the second center point is determined. In this manner, it is possible to realize the precise positioning of the liquid injection hole 10, so as to ensure that the metal structure can reliably seal the liquid injection hole 10.

There is a preset distance between the first center point and the second center point, and after the liquid injection hole 10 and the positioning portion 20 are formed on the battery, the liquid injection hole 10 and the positioning portion 20 respectively have a first center point and a second center point. The relationship between the first center point and the second center point is determined, that is, after the battery is manufactured, the positional relationship between the liquid injection hole 10 and the positioning portion 20 is certainly determined. Therefore, the preset distance between the first center point and the second center point is a fixed value. For example, the preset distance between the first center point and the second center point may be 0, that is, the first center point coincides with the second center point, and therefore, the positioning efficiency of the liquid injection hole 10 may be improved to a certain extent, thereby improving the manufacturing efficiency of the battery, and the precise positioning of the liquid injection hole 10 may be ensured. Alternatively, the preset distance may not be equal to 0. For example, the preset distance may include a certain value A(x, y) in the plane coordinate system. For example, the value of the x-coordinate axis is 0, and the value of the y-coordinate axis is 1. Or, the value of the x-coordinate axis is 1, and the value of the y-coordinate axis is 0, or, the value of the x-coordinate axis is 1, and the value of the y-coordinate axis is 1, etc., which are not limited in the disclosure. When sealing the liquid injection hole 10, it is only necessary to accurately determine the second center point of the positioning portion 20, and then obtain the first center point of the liquid injection hole 10 according to the known positional relationship between the liquid injection hole 10 and the positioning portion 20.

In an embodiment, there is one positioning portion 20, and the positioning portion 20 includes a circular arc structure. The extending direction of the circular arc structure around the liquid injection hole 10 is an arc direction, and the center of the circular arc structure is the second center point. That is, by obtaining the center of the circular arc structure, it is possible to determine the first center point subsequently based on the preset distance between the first center point and the second center point, so as to realize precise positioning of the liquid injection hole 10.

Figure 3:
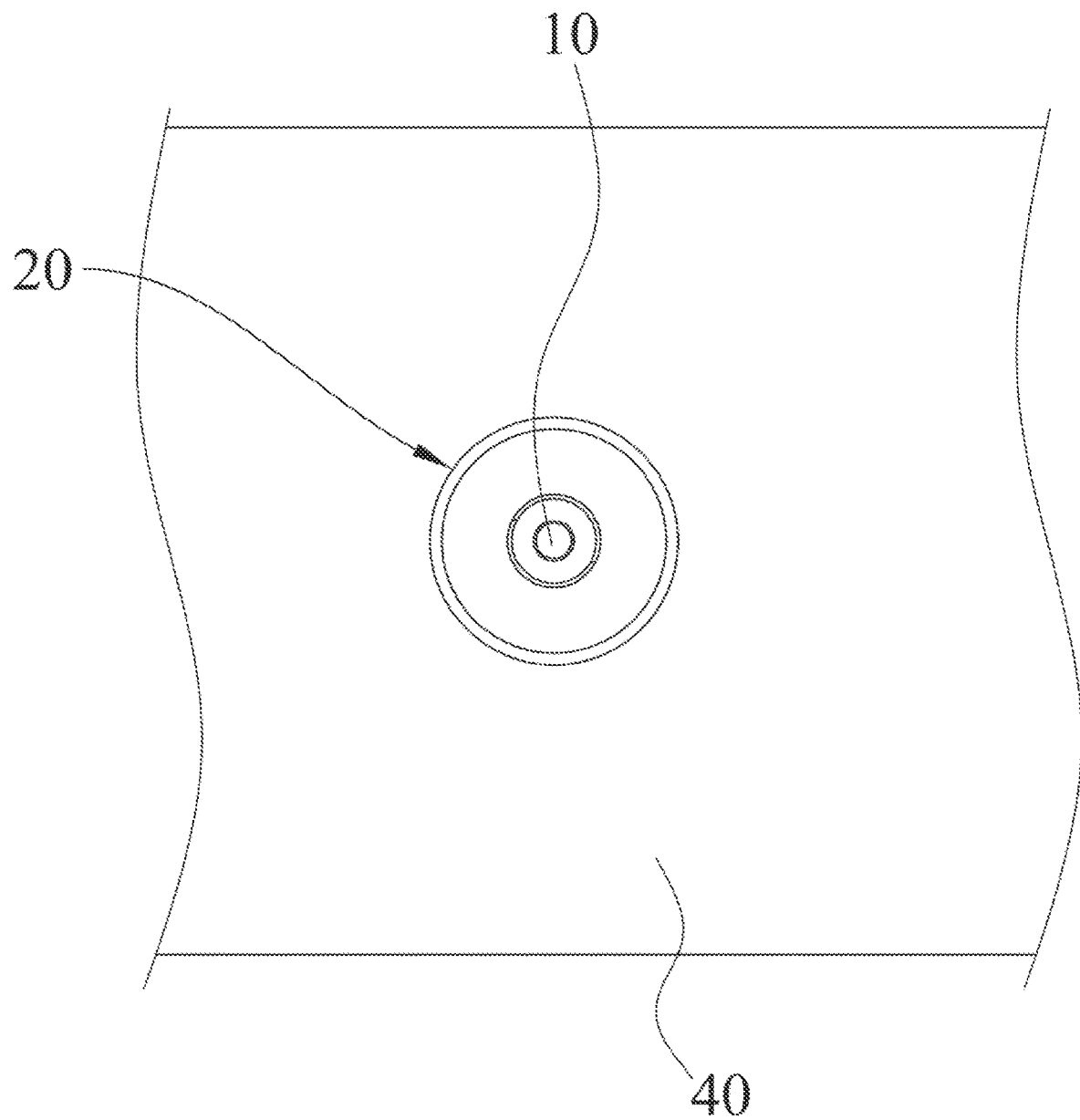
FIG. 3 is a partial structural diagram of a battery according to the second exemplary embodiment.

The extending direction of the circular arc structure around the liquid injection hole 10 is an arc direction, that is, the circular arc structure is arranged around the liquid injection hole 10, and the circular arc structure may form a circumferentially closed circle, as shown in FIG. 3, or, the circular arc structure may form a circumferentially non-closed circle. The center of the circular arc structure may be fitted by obtaining the image information of the circular arc structure, so that the second center point may be obtained accurately, and the first center point may be further determined.

In an embodiment, the positioning portion 20 includes a linear structure, and the linear structure at least includes two linear directions around the extending direction of the liquid injection hole 10, and the midpoint of the linear structure is the second center point. That is, by obtaining the midpoint of the linear structure, it is possible to determine the first center point subsequently according to the preset distance between the first center point and the second center point, so as to realize precise positioning of the liquid injection hole 10.

Figure 4:
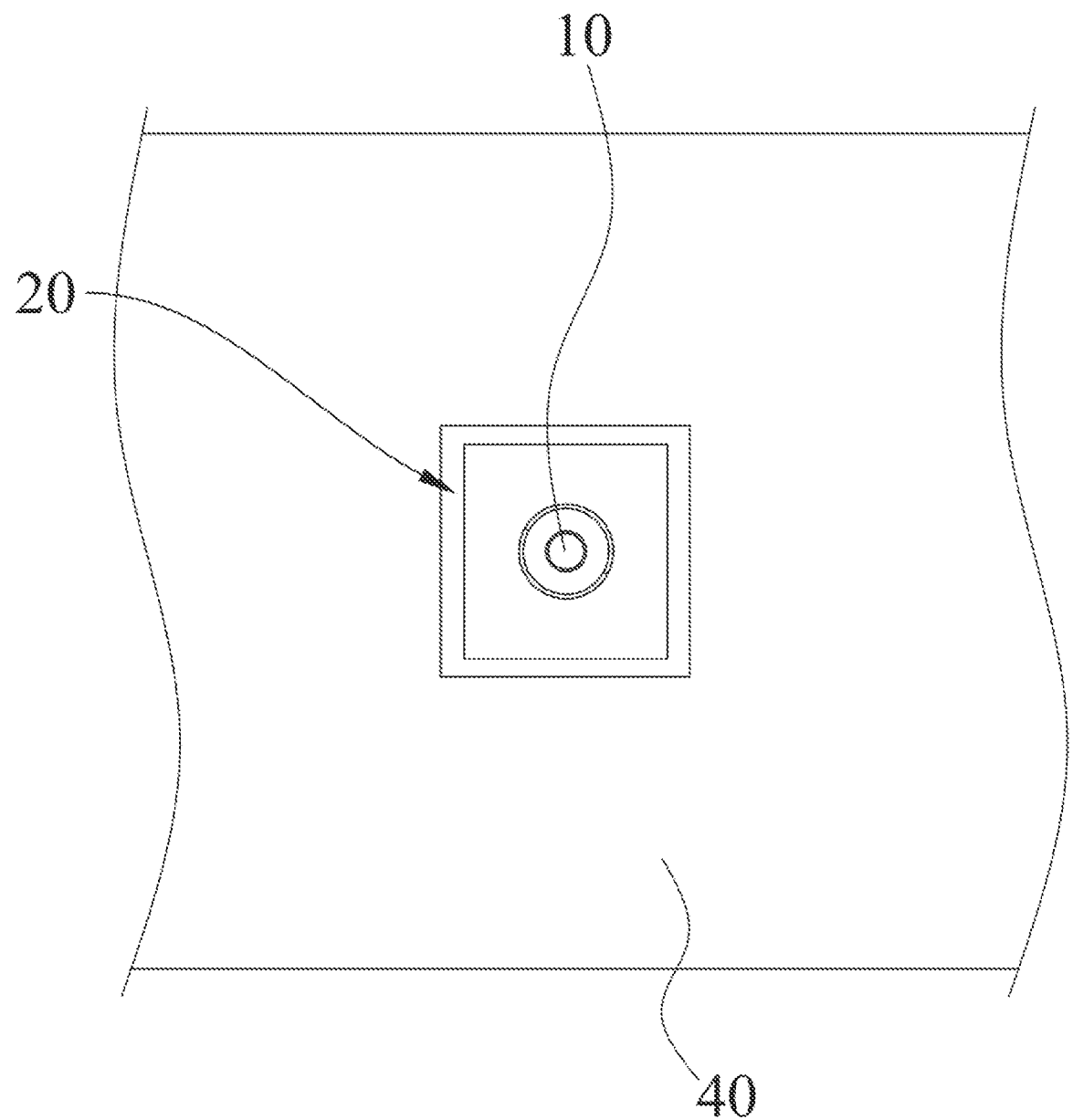
FIG. 4 is a partial structural diagram of a battery according to the third exemplary embodiment.

The extending direction of the linear structure around the liquid injection hole 10 at least includes two linear directions, that is, the linear structure may be arranged on the outer periphery of the liquid injection hole 10, and the linear structure may form a circumferentially closed rectangle, as shown in FIG. 4. Under the circumstances, the midpoint of the rectangle is the intersection point of the two diagonals of the rectangle, i.e., the second center point. Alternatively, the linear structure may form a circumferentially non-closed structure. For example, the linear structure may be L-shaped, and the connection line formed at the two ends of the linear structure and the linear structure may form an isosceles right triangle. The midpoint of the connection line formed at the two ends of the linear structure is the second center point. The linear structure may be U-shaped, and the connection line formed at the two ends of the linear structure and the linear structure may form a rectangle. Under the circumstances, the midpoint of the rectangle is the intersection point of the two diagonals of the rectangle, i.e., the second center point.

It should be noted that there is only one positioning portion 20, and the positioning portion 20 may be a recessed structure, a raised structure, or a marking line, etc., which is not limited in the disclosure.

Figure 2:
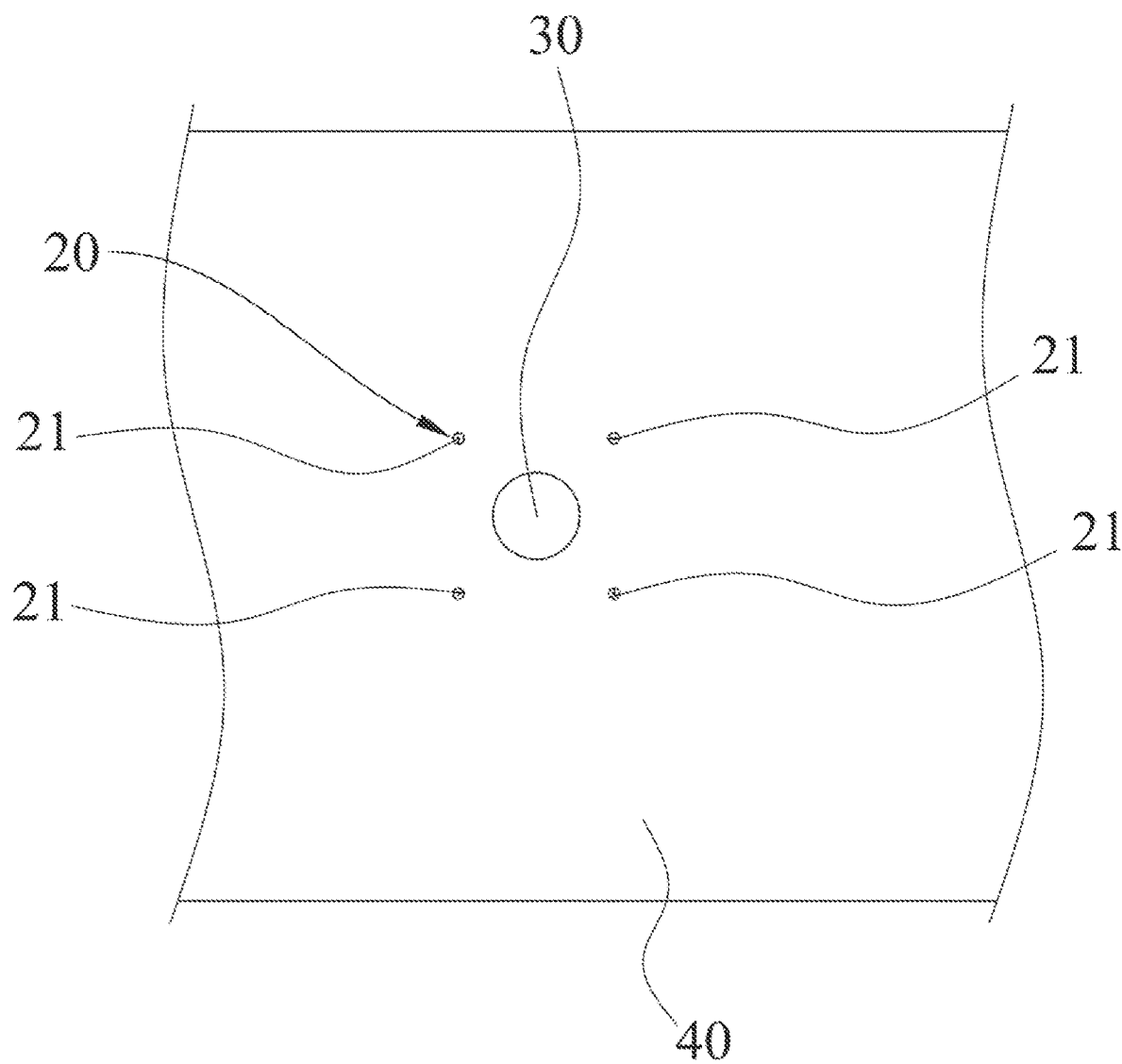
FIG. 2 is a partial structural diagram of a battery provided with a sealing structure according to the first exemplary embodiment.

In an embodiment, as shown in FIG. 1 and FIG. 2, the positioning portion 20 includes a plurality of sub-positioning segments 21 independent of each other, and each sub-positioning segment 21 has a center point.

The line connecting the center points of each sub-positioning segment 21 may form a circle, and the center of the circle is the second center point, that is, the plurality of sub-positioning segments 21 may be located on a circle, and the first center point is determined through the center of the circle, so as to realize the precise positioning of the liquid injection hole 10. For example, there can be three sub-positioning segments 21, and the center points of the three sub-positioning segments 21 may fit a circle, and the center of this circle is the second center point.

Each sub-positioning segment 21 has a center point. For example, the sub-positioning segment 21 may be a circle, a rectangle, a triangle, etc., and it is sufficient for the sub-positioning segment 21 to determine only one center point. A plurality of center points may fit a circle, and the point of this circle is the second center point.

In an embodiment, the positioning portion 20 includes a plurality of sub-positioning segments 21 independent of each other, and each sub-positioning segment 21 has a center point. The line connecting the center points of each sub-positioning segment 21 may form a polygon, the midpoint of the polygon is the second center point, and the number of sides of the polygon is n, and n≥3. That is, the plurality of sub-positioning segments 21 may be located on a polygon, and the first center point is determined through the midpoint of the polygon, so as to realize precise positioning of the liquid injection hole 10. For example, there may be four sub-positioning segments 21, and the center points of the four sub-positioning segments 21 may fit a rectangle, and the midpoint of this rectangle is the second center point.

Each sub-positioning segment 21 has a center point. For example, the sub-positioning segment 21 may be a circle, a rectangle, a triangle, etc., and it is sufficient for the sub-positioning segment 21 to determine only one center point. A plurality of center points may fit a polygon, for example, there may be three sub-positioning segments 21, and the center points of the three sub-positioning segments 21 may fit a triangle, and the triangle may be a right-angled isosceles triangle or an equilateral triangle.

In an embodiment, the sub-positioning segments 21 are protrusions, recesses or marks, so that a circle or polygon may be fitted by a plurality of sub-positioning segments 21, so as to determine the second center point, thereby determining the first midpoint, and the precise positioning of the liquid injection hole 10 is realized.

The protrusions and recesses may form circles, arcs or polygons, and the marks may form circles, arcs or polygons, which are not limited in the disclosure, and the emphasis is that the center point may be determined to fit the second center point.

In an embodiment, the opening area of the opening end of the recess is larger than the cross-sectional area of the bottom wall of the recess, which not only facilitates the formation of the recess, but also forms a shadow to facilitate positioning when the positioning portion 20 performs positioning by taking pictures.

In an embodiment, the recess includes a tapered hole segment or a circular hole segment, so that the opening area of the recess is not smaller than the area of the cross section at each position of the recess, that is, the area of the top of the recess is larger, while the area of the bottom of the recess is smaller, which not only facilitates the formation of the recess, but also forms a shadow to facilitate positioning when the positioning portion 20 performs positioning by taking pictures.

Figure 5:
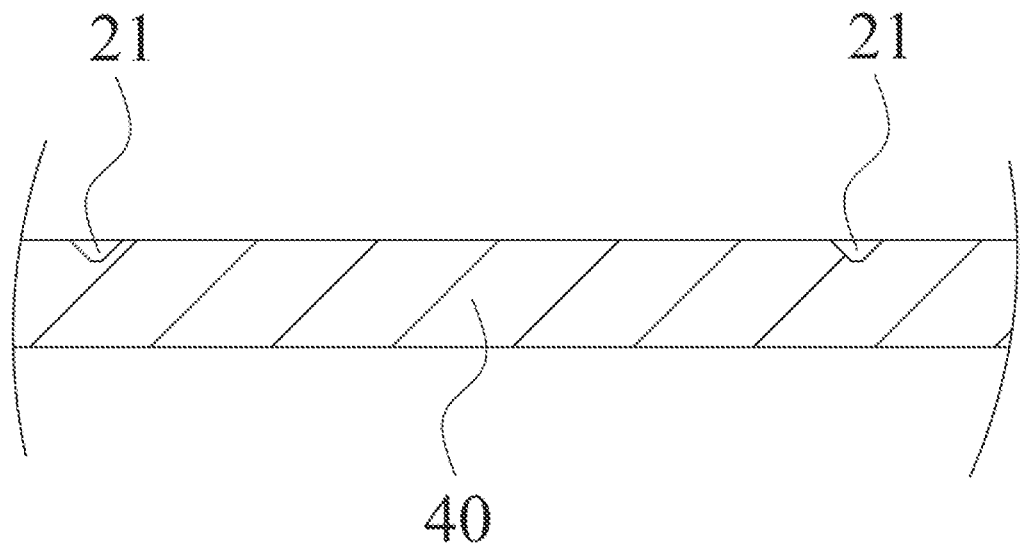
FIG. 5 is a cross-sectional partial structural diagram of a battery according to an exemplary embodiment.
Figure 6:
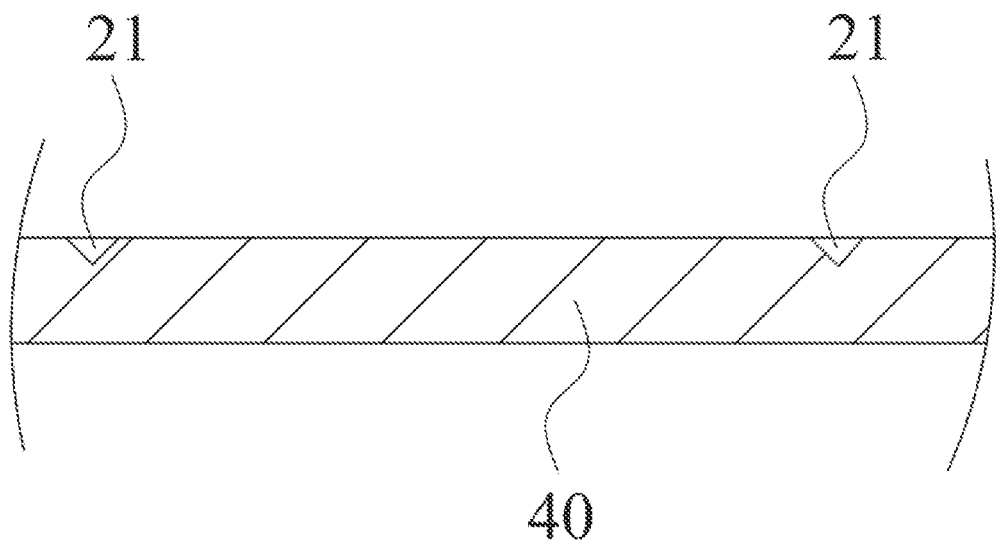
FIG. 6 is a cross-sectional partial structural diagram of a battery according to another exemplary embodiment.

As shown in FIG. 5, the recess includes a circular hole segment, and the top opening of the recess is larger than the bottom end of the recess. As shown in FIG. 6, the recess includes a tapered hole segment.

In an embodiment, the diameter of opening of the recess is 0.5 mm to 1.5 mm, which not only ensures that the recess can have a sufficient shadow area for easy positioning, but also prevents the recess from occupying an excessively large area of the battery, thereby ensuring the structural strength of the battery.

The opening of the recess is circular, and the diameter of the recess may be 0.5 mm, 0.6 mm, 0.7 mm, 0.8 mm, 0.9 mm, 9 mm, 1.1 mm, 1.2 mm, 1.3 mm, 1.4 mm or 1.5 mm and so on.

In an embodiment, the diameter of the bottom end of the recess is less than one-third of the diameter of the opening of the recess, so that the recess can form a circular hole segment, and accurate image information can be obtained when taking pictures of the circular hole segment, thereby accurately fitting the second center point.

In an embodiment, the included angle between the side wall of the recess and the centerline of the recess is 30° to 60°, so that the recess may form a tapered hole segment or a circular hole segment, and it is possible to obtain good image information when taking pictures of the recess, so as to accurately determine the position information of the recess.

The included angle between the side wall of the recess and the centerline of the recess may be 30°, 31°, 32°, 35°, 38°, 40°, 45°, 50°, 55°, 58°, 59° or 60° and so on.

In an embodiment, the depth of the recess is 0.1 mm to 1.2 mm, which not only makes it possible to accurately obtain the image information of the recess, but also can avoid affecting the structural strength of the battery due to the deep depth of the recess.

Further, the depth of the recess is 0.4 mm to 0.5 mm, so as to ensure that multiple recesses may fit the second center point, and ensure that the recesses will not damage the structural strength of the battery.

The depth of the recess may be 0.1 mm, 0.15 mm, 0.2 mm, 0.3 mm, 0.35 mm, 0.4 mm, 0.45 mm, 0.5 mm, 0.55 mm, 0.6 mm, 0.7 mm, 0.8 mm, 0.9 mm, 1 mm, 1.1 mm, 1.15 mm or 1.2 mm and so on.

In an embodiment, the distance between the center point of the sub-positioning segment 21 and the first center point is 4 mm to 15 mm. In this manner, it is possible to prevent the short distance between the sub-positioning segment 21 and the liquid injection hole 10 from causing the electrolyte crystallization to block the sub-positioning segment 21, and also prevent the long distance between the sub-positioning segment 21 and the liquid injection hole 10 from making it difficult to form the sub-positioning segment 21. Also, it is possible to prevent the sub-positioning segment 21 from being too close the circumferential outer edge of the battery and causing damage to the structural strength of the battery.

The distance between the center point of the sub-positioning segment 21 and the first center point may be 4 mm, 4.1 mm, 4.2 mm, 4.5 mm, 5 mm, 6 mm, 7 mm, 8 mm, 9 mm, 10 mm, 11 mm, 12 mm, 13 mm, 14 mm, 14.5 mm, 14.8 mm, 14.9 mm or 15 mm and so on.

It should be noted that when there is one positioning portion 20, the positioning portion 20 may be a recess, and the depth of the recess may also be 0.1 mm to 1.2 mm, and further, the depth of the recess may also be 0.4 mm to 0.5 mm.

In an embodiment, as shown in FIG. 2, the battery further includes a sealing structure 30, and at least part of the sealing structure 30 is sealed in the liquid injection hole 10. That is, after the electrolyte is injected into the battery through the liquid injection hole 10, the liquid injection hole 10 may be sealed through the sealing structure 30. During the sealing process of the sealing structure 30, the second center point may be fitted through the positioning portion 20, thereby determining the first center point of the liquid injection hole 10, and accurate positioning of the liquid injection hole 10 is realized, which facilitates to accurately dispose the sealing structure 30 into the liquid injection hole 10.

In an embodiment, the sealing structure 30 may include an elastic structure, for example, the sealing structure 30 may include a sealing nail.

In an embodiment, the sealing structure 30 may include a metal member, and the metal member may pass through the liquid injection hole 10, or the metal member may be welded to the battery, so as to achieve reliable sealing of the liquid injection hole 10. Moreover, the accurate positioning of the liquid injection hole 10 needs to be ensured when using a metal member to realize the sealing of the liquid injection hole 10. Therefore, in this embodiment, the positioning portion 20 may be used to fit the second center point first, so as to determine the first center point of the liquid injection hole 10, thus realizing the accurate positioning of the liquid injection hole 10.

In an embodiment, the sealing structure 30 is a riveted sealing structure. Therefore, after the sealing structure 30 is disposed in the liquid injection hole 10, the main body of the sealing structure 30 may be deformed by pulling the rivet, so as to realize reliable contact between the main body of the sealing structure 30 and the liquid injection hole 10, and reliable sealing of the liquid injection hole 10 may be achieved.

It should be noted that the rivet sealing structure may be a rivet structure in the related art. For example, the rivet structure may include a rivet and a main body, and the rivet is located in the main body. After the rivet structure is disposed in the liquid injection hole 10, the main body may be deformed by pulling the rivet, so as to realize reliable contact between the main body and the liquid injection hole 10, and reliable sealing of the liquid injection hole 10 may be achieved.

In an embodiment, the liquid injection hole 10 and the positioning portion 20 are disposed on the same surface of the battery, which not only improves the space utilization of the battery, but also facilitates to determine the positions of the liquid injection hole 10 and the positioning portion 20.

In an embodiment, as shown in FIG. 1 to FIG. 6, the battery includes a battery housing 40, and the liquid injection hole 10 and the positioning portion 20 are both arranged on the battery housing 40, so that the positioning portion 20 can assist positioning of the liquid injection hole 10, so as to accurately position the liquid injection hole 10, and thereby ensuring that the sealing structure 30 can be accurately fixed in the liquid injection hole 10.

The liquid injection hole 10 may pass through the battery housing 40, and the battery housing 40 is provided with a cell, so as to realize the reliable liquid injection for the battery. The positioning portion 20 is disposed on the battery housing 40, and the positioning portion 20 can be a protrusion, a recess or a mark, etc. In some embodiments, the recess may be a groove, or it is not excluded that the recess may be a through hole. The battery housing 40 may include a cover plate, and the liquid injection hole 10 and the positioning portion 20 are disposed on the cover plate.

The battery may include a cell and an electrolyte, the minimum unit capable of performing electrochemical reactions such as charging/discharging. The cell refers to a unit formed by winding or laminating a stack portion including a first electrode, a separator and a second electrode. When the first electrode is a positive electrode, the second electrode is a negative electrode, and the polarities of the first electrode and the second electrode are interchangeable.

The battery is a stacked battery, which not only facilitates grouping, but also can be processed to obtain a battery with a long length. Specifically, the cell is a stacked cell, and the cell has a first electrode sheet stacked on each other, a second electrode sheet electrically opposite to the first electrode sheet, and a separator sheet arranged between the first electrode sheet and the second electrode sheet. In this way, multiple pairs of the first electrode sheet and the second electrode sheet are stacked to form a stacked cell.

Optionally, the battery may be a wound battery, that is, the first electrode sheet, the second electrode sheet that is electrically opposite to the first electrode sheet, and the separator sheet disposed between the first electrode sheet and the second electrode sheet are wound to obtain a wound cell.

An embodiment of the present disclosure further provides a battery assembly, and the battery assembly includes the battery described above.

The battery assembly in an embodiment of the present disclosure includes a battery, and the battery includes a liquid injection hole 10 and a positioning portion 20. The liquid injection hole 10 is configured to inject electrolyte into the battery, and the configuration of the positioning portion 20 may be used as an auxiliary positioning structure in the process of positioning the liquid injection hole 10, so as to realize precise positioning of the liquid injection hole 10. The liquid injection hole 10 has a first center point, the positioning portion 20 is formed with a second center point, and there is a preset distance between the first center point and the second center point. Even if crystallization is formed around the liquid injection hole 10 during the electrolyte injection process, and it is difficult to directly determine the first center point of the liquid injection hole 10, since the presence of the positioning portion 20 makes it possible to accurately determine the second center point, the first center point may be accurately determined through the preset relationship between the first center point and the second center point, and the liquid injection hole 10 may be positioned accurately. In this manner, the subsequent precise sealing of the liquid injection hole 10 may be ensured, thereby improving the safe operation performance and manufacturing efficiency of the battery assembly.

In an embodiment, the battery assembly is a battery module or a battery pack.

The battery module includes a plurality of batteries, and the battery module may further include end plates and side plates, and the end plates and side plates are configured to fix the plurality of batteries.

It should be noted that multiple batteries may form a battery module and be placed in a battery box, and multiple batteries may be fixed by using end plates and side plates. The plurality of batteries may be directly arranged in the battery box, that is, there is no need to group a plurality of batteries, and under the circumstances, the end plates and side plates may be removed.

The battery may be a square battery, that is, the battery may be a quadrangular prism battery. The quadrangular prism battery mainly refers to the battery with the shape of a prism, but it is not necessarily limited that every side of the prism must be a straight line in the strict sense, and the angles between various sides do not have to be right angles, but can be circular arc transitions.

In some embodiments, it is not excluded that the battery may be a cylindrical battery.

Figure 7:
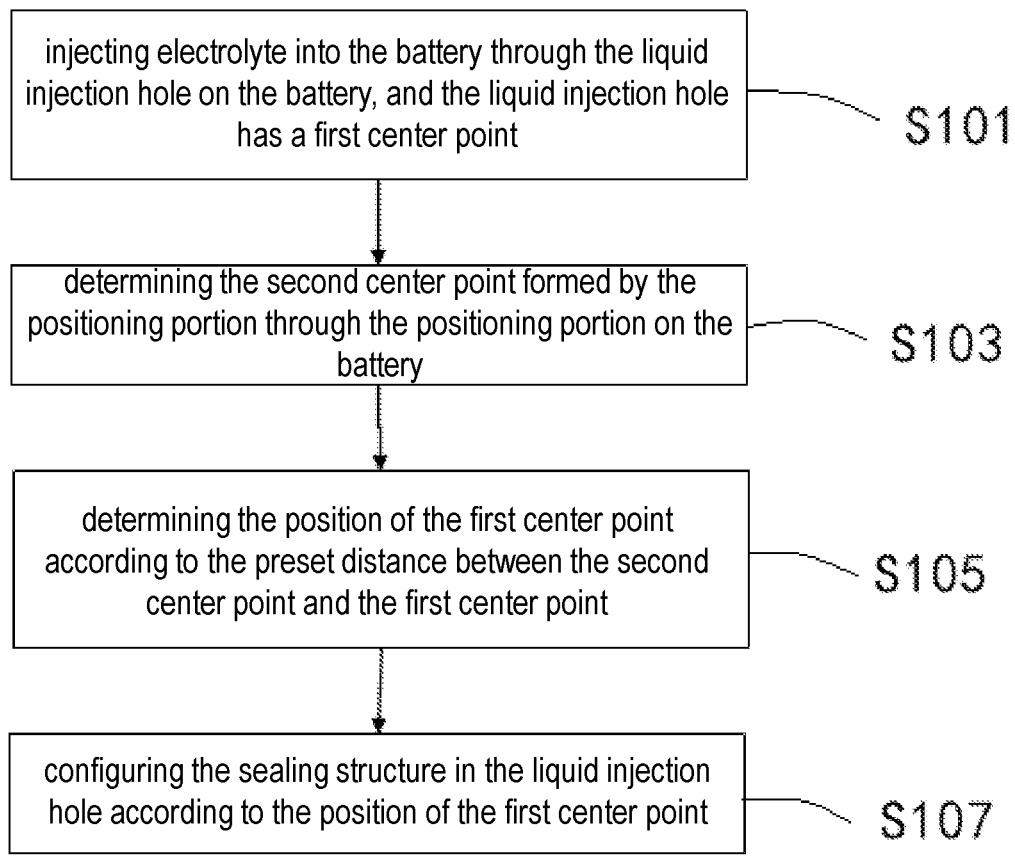
FIG. 7 is a schematic flowchart of a method for manufacturing a battery according to an exemplary embodiment.

An embodiment of the present disclosure further provides a battery manufacturing method, please refer to FIG. 7, the battery manufacturing method includes: S101. injecting electrolyte into the battery through the liquid injection hole 10 on the battery, and the liquid injection hole 10 has a first center point; S103. determining the second center point formed by the positioning portion 20 through the positioning portion 20 on the battery; S105. determining the position of the first center point according to the preset distance between the second center point and the first center point; S107. configuring the sealing structure 30 in the liquid injection hole 10 according to the position of the first center point.

The battery manufacturing method in an embodiment of the present disclosure includes injecting electrolyte into the battery through the liquid injection hole 10 on the battery, and determining the second center point formed by the positioning portion 20 through the positioning portion 20 on the battery. There is a preset distance between the first center point and the second center point. Even if crystallization is formed around the liquid injection hole 10 during the electrolyte injection process, and it is difficult to directly determine the first center point of the liquid injection hole 10, since the presence of the positioning portion 20 makes it possible to accurately determine the second center point, the first center point may be accurately determined through the preset relationship between the first center point and the second center point, and the liquid injection hole 10 may be positioned accurately. In this manner, it may be ensured that the sealing structure 30 is accurately disposed in the liquid injection hole 10, so as to realize reliable sealing of the liquid injection hole 10, and improve the safe operation performance and manufacturing efficiency of the battery.

In an embodiment, the step of determining the second center point formed by the positioning portion 20 through the positioning portion 20 on the battery includes: acquiring image information of the positioning portion 20 by using a visual detection system and fitting the second center point according to the image information, so that the position of the first center point may be determined according to the second center point, thereby ensuring that the sealing structure 30 is accurately disposed in the liquid injection hole 10 in the subsequent process.

The visual detection system may include a camera, and the camera is able to obtain image information with the positioning portion 20 by taking a picture of the battery. For example, there may be one positioning portion 20, and the positioning portion 20 may include a circular arc structure or a linear structure, so that the second center point may be fitted through the circular arc structure or the linear structure. The image information may have a reference position point, and this reference position point may correspond to a certain fixed position of the battery. Therefore, after the second center point is obtained by fitting, the specific position of the second center point in the battery may be obtained according to a certain fixed position of the battery. Subsequently, the position of the first center point may be accurately obtained according to the positional relationship between the first center point and the second center point, so as to facilitate the sealing structure 30 to be accurately configured in the liquid injection hole 10.

The camera and sealing structure 30 of the visual detection system may be disposed on the same mechanical arm structure, and the image information is collected by the visual detection system, and the precise position of the second center point is determined after analysis, so that the mechanical arm structure may be moved by a fixed distance to the position of the liquid injection hole 10. In this manner, the sealing structure 30 may be accurately configured in the liquid injection hole 10.

It should be noted that reference of the related structure of the positioning portion 20 may be derived from the related structure of the battery described above, so that the second center point of the positioning portion 20 may be accurately fitted.

In an embodiment, the battery manufacturing method further includes: forming the liquid injection hole 10 and the positioning portion 20 on the same surface of the battery.

In an embodiment, the battery manufacturing method further includes: forming the liquid injection hole 10 and the positioning portion 20 on the battery housing 40, and setting a preset distance between the first center point and the second center point. When the liquid injection hole 10 is sealed subsequently, and after the second center point is obtained, the position of the first center point may be determined according to the preset distance determined when the liquid injection hole 10 and the positioning portion 20 are formed, so as to ensure that the sealing structure 30 is accurately configured in the liquid injection hole 10.

The battery housing 40 may include a cover plate. The liquid injection hole 10 passing through the cover plate is formed on the cover plate through processing, and the positioning portion 20 may be formed according to the position of the liquid injection hole 10. Moreover, a preset distance is formed between the first center point and the second center point. For example, the first center point coincides with the second center point, or the distance between the first center point and the second center point is greater than 0. In this manner, after determining the position of the second center point on the cover plate, the precise position of the first center point of the liquid injection hole 10 may be obtained.

For the specific structural form of the positioning portion 20, reference may be made to the relevant structural form of the battery described above, which is not limited in the disclosure. The positioning portion 20 may be formed by adding a material, removing a material, stamping and other processes, which are not limited in the disclosure.

In an embodiment, the step of configuring the sealing structure 30 in the liquid injection hole 10 according to the position of the first center point includes: sealing the sealing structure 30 in the liquid injection hole 10 by using a riveting sealing process, so that it may be ensured that the liquid injection hole 10 is reliably sealed by the sealing structure 30 to avoid the problem of liquid leakage in the battery.

Specifically, the rivet structure may include a rivet and a main body, and the rivet is located in the main body. After the position of the liquid injection hole 10 is determined through the positioning portion 20, the rivet structure is disposed in the liquid injection hole 10, and the main body may be deformed by pulling the rivet, so as to realize reliable contact between the main body and the liquid injection hole 10, and the liquid injection hole 10 is reliably sealed.

In some embodiments, the sealing structure 30 may also include an elastic structure, and the elastic structure may be interference fit in the liquid injection hole 10. Alternatively, the sealing structure 30 may include a metal member, and the metal member may be welded on the battery housing 40.

In an embodiment, the manufacturing method of the battery may be used to form the battery described above, and reference of the relevant structure of the battery in this embodiment may be derived from the specific structure of the battery described above, so the details are not repeated here.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery, comprising a liquid injection hole and a positioning portion, wherein the liquid injection hole has a first center point, the positioning portion is formed with a second center point, and there is a preset distance between the first center point and the second center point, so as to determine the first center point through the second center point, wherein the liquid injection hole and the positioning portion are both disposed on a same surface of the battery.

2. The battery according to claim 1, wherein the first center point coincides with the second center point.

3. The battery according to claim 2, wherein the number of the positioning portion is one, and the positioning portion comprises a circular arc structure, an extending direction of the circular arc structure around the liquid injection hole is an arc direction, and a center of the circular arc structure is the second center point;

or, the positioning portion comprises a linear structure, and an extending direction of the linear structure around the liquid injection hole at least comprises two linear directions, and a midpoint of the linear structure is the second center point.

4. The battery according to claim 2, wherein the positioning portion comprises a plurality of sub-positioning segments independent of each other, and each of the sub-positioning segments has a center point;

wherein a line connecting the center point of each of the sub-positioning segments is able to form a circle, and a center of the circle is the second center point; or, the line connecting the center point of each of the sub-positioning segments is able to form a polygon, a midpoint of the polygon is the second center point, and the number of sides of the polygon is n, wherein n≥3.

5. The battery according to claim 4, wherein the sub-positioning segments are protrusions, recesses or marks.

6. The battery according to claim 5, wherein an opening area of an opening end of the recess is larger than a cross-sectional area of a bottom wall of the recess.

7. The battery according to claim 6, wherein a diameter of the opening of the recess is 0.5 mm to 1.5 mm.

8. The battery according to claim 6, wherein an included angle between a side wall of the recess and a centerline of the recess is 30° to 60°.

9. The battery according to claim 5, wherein a depth of the recess is 0.1 mm to 1.2 mm.

10. The battery according to claim 4, wherein a distance between the center point of the sub-positioning segment and the first center point is 4 mm to 15 mm.

11. The battery according to claim 1, wherein the battery further comprises a sealing structure, at least a part of the sealing structure is sealed in the liquid injection hole;

wherein the sealing structure comprises a metal member.

12. The battery according to claim 11, wherein the sealing structure is a rivet sealing structure.

13. The battery according to claim 1, wherein the battery comprises a battery housing, and the liquid injection hole and the positioning portion are both disposed on the battery housing.

14. A manufacturing method of a battery, comprising:

injecting an electrolyte into the battery through a liquid injection hole on the battery, wherein the liquid injection hole has a first center point;

determining a second center point formed by a positioning portion through the positioning portion on the battery, wherein the liquid injection hole and the positioning portion are both disposed on a same surface of the battery;

determining a position of the first center point according to a preset distance between the second center point and the first center point;

configuring a sealing structure in the liquid injection hole according to the position of the first center point.

15. The manufacturing method of the battery according to claim 14, wherein the step of determining the second center point formed by the positioning portion through the positioning portion on the battery comprises:
   acquiring image information of the positioning portion by using a visual detection system and fitting the second center point according to the image information.

16. The manufacturing method of the battery according to claim 14, further comprising:
   forming the liquid injection hole and the positioning portion on a battery housing, and setting the preset distance between the first center point and the second center point.

17. The manufacturing method of the battery according to claim 14, wherein the first center point coincides with the second center point.

18. The manufacturing method of the battery according to claim 14, wherein the step of configuring the sealing structure in the liquid injection hole according to the position of the first center point comprises:
   sealing the sealing structure in the liquid injection hole by using a riveting sealing process.

* * * * *